(12) United States Patent
Wang (10) Patent No.: US 7,597,649 B2
(45) Date of Patent: *Oct. 6, 2009

(54) AUTOMATIC TRANSMISSION SHIFTER ASSEMBLY WITH INTEGRATED IGNITION ACTUATOR

(75) Inventor: Yong Qiang Wang, Troy, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 168 days.

This patent is subject to a terminal disclaimer.

(21) Appl. No.: 11/840,539

(22) Filed: Aug. 17, 2007

(65) Prior Publication Data
US 2008/0051253 A1 Feb. 28, 2008

Related U.S. Application Data

(63) Continuation of application No. 11/195,874, filed on Aug. 3, 2005, now Pat. No. 7,270,623.

(60) Provisional application No. 60/667,143, filed on Mar. 31, 2005.

(51) Int. Cl.
*F16H 59/74* (2006.01)
(52) U.S. Cl. ....................................................... 477/99

(58) Field of Classification Search .................. 477/96, 477/99
See application file for complete search history.

(56) References Cited

U.S. PATENT DOCUMENTS

| 5,647,818 | A * | 7/1997 | Moody ......................... 477/99 |
| 6,547,696 | B2 * | 4/2003 | Syamoto et al. ................ 477/99 |
| 6,568,228 | B2 * | 5/2003 | Hasegawa ..................... 70/247 |

* cited by examiner

*Primary Examiner*—Dirk Wright
(74) *Attorney, Agent, or Firm*—Banner & Witcoff Ltd; Peter D. McDermott; Dean B. Watson (57) ABSTRACT

An automatic transmission shifter assembly comprises a shift lever support configured for attachment to a vehicle, a shift lever mounted to the shift lever support to shift between transmission gear settings; a brake transmission system interlock (BTSI) comprising a shift lever control member controllable by actuation of a solenoid or other powered actuator to selectively block the shift lever from moving out of the PARK position. An electronic ignition switch, an ignition actuator and an ignition key interlock are mounted to the shift lever support. The ignition key interlock comprises an interlock member controllable by the ignition actuator to selectively block the solenoid from moving the shift lever control member to the unblock position.

18 Claims, 7 Drawing Sheets

AUTOMATIC TRANSMISSION SHIFTER ASSEMBLY WITH INTEGRATED IGNITION ACTUATOR

CROSS-REFERENCED APPLICATIONS AND PRIORITY CLAIM

This application claims the benefit of, and is a continuation application of, co-pending U.S. patent application Ser. No. 11/195,874 filed on Aug. 3, 2005, entitled "Automatic Transmission Shifter Assembly With Integrated Ignition Actuator", which claims the priority benefit of U.S. provisional patent application Ser. No. 60/667,143, filed on Mar. 31, 2005, entitled "Automatic Transmission Shifter Assembly With Integrated Ignition Actuator".

INTRODUCTION

The present invention is directed to an automatic transmission shifter assembly and, more particularly, to an automatic transmission shifter assembly with integrated ignition actuator.

BACKGROUND

Automatic transmission shifters are known for use in motor vehicles. In some cases the shifter employs a shifter assembly mounted to the floor of the passenger compartment of the vehicle or to another suitable part of the vehicle body or frame. Such shifter assemblies often comprise a mounting structure and/or protective housing for at least part of a manually operable shift lever, e.g., for parts of a pivot structure of the shift lever. Various optional or required sensors, cable attachments, lighting units, gear selection indicators and other components may also be included in such shifter assembly mounted to the vehicle. For some such vehicles the applicable government regulations or industry design standards call for a key interlock system and a brake transmission system interlock, often referred to as a BTSI, which operates within the shifter assembly to prevent movement of the shift lever out of the PARK gear setting unless the foot brake is engaged. Variations on the BTSI interlock strategy are known to those who are skilled in this area.

Improvements in the design or functionality of automatic transmission shifters are desired by vehicle manufacturers. In order to achieve improved customer satisfaction and/or other design objectives. Accordingly, it is an objective of the inventive subject matter disclosed here to provide improved automatic transmission shifters. It is an objective of at least certain exemplary embodiments of the automatic transmission shifters disclosed here to provide integrated ignition actuators. Other objectives applicable to some or all of the inventive subject matter disclosed here will be apparent to those who are skilled in this area once they are given the benefit of this disclosure.

SUMMARY

In accordance with a first aspect, an automatic transmission shifter assembly comprises a shift lever support configured for attachment to a vehicle. The shift lever support includes at least a unitary molded plastic housing component referred to further below. The automatic transmission shifter assembly according to this disclosure also comprises a shift lever mounted to the unitary molded plastic housing component. The shift lever typically will be a manually operable shift lever to be used by the vehicle operator to shift transmission gears, e.g., to shift back and forth between gear shift positions including at least, in any order, PARK, NEUTRAL and DRIVE positions corresponding to the transmission gear settings of the same names. The automatic transmission shifter also comprises a brake transmission system interlock (BTSI) mounted to the unitary molded plastic housing and comprising a powered actuator, typically, e.g., an electrically powered solenoid or the like, and a shift lever control member. The shift lever control member is controllable by actuation of the powered actuator. When actuated, the solenoid or other actuator applies force to urge the shift lever control member between positions including at least (i) a shift lever block position in which the shift lever control member is positioned to block the shift lever from moving out of the PARK position, and (ii) a shift lever unblock position in which the shift lever control member is not positioned to block the shift lever from moving out of the PARK position. The automatic transmission shifter also comprises an electronic ignition switch mounted to the unitary molded plastic housing and having conditions including at least (i) an IGNITION condition corresponding to ignition of a vehicle's power system, and (ii) a NON-IGNITION condition. As used here, the phrase "corresponding to ignition of a vehicle's power system" means (a) that the condition of the ignition switch enables and/or participates in causing initial ignition of the vehicle's engine or motor (or at least one of them in vehicles having both) from a stopped or not running condition, and/or (b) that the condition of the ignition switch enables and/or participates in causing the vehicle's engine or motor to continue running (other necessary conditions being met, e.g., the availability of a supply of fuel, battery power, etc.). The vehicle's engine or motor may be, for example, a diesel or gasoline engine or the like or an electric or other motor or the like. The automatic transmission shifter assembly according to this disclosure also comprises an ignition actuator mounted to the unitary molded plastic housing and operative to control the condition of the electronic ignition switch. The ignition actuator in certain exemplary embodiments is an ignition key socket which may operate by rotation, push or other manner. The ignition actuator is operable connected to the ignition switch and has multiple positions or other conditions, including at least (i) an actuator IGNITION condition (e.g., a rotational position) corresponding to the IGNITION condition of the electronic ignition switch, and (ii) an actuator NON-IGNITION condition (again, e.g., a rotational position) corresponding to the NON-IGNITION condition of the electronic ignition switch. For example, in certain exemplary embodiments the ignition key socket (or other version of ignition actuator) will be rotatable (or otherwise movable or switchable) from an initial LOCK position when the key is first inserted, to an ACC position in which the ignition switch is put into a condition in which electric power from a vehicle battery is supplied to selected devices or systems of the motor vehicle, to an ON position in which the ignition switch is put into a condition for the vehicle engine or motor to run, to a START position in which the ignition switch is put into a condition in which the engine or motor is started. In certain exemplary embodiments a rotatable ignition key socket is spring biased from the START position back toward the ON position.

The automatic transmission shifter assembly according to this disclosure also comprises an ignition key interlock mounted to the unitary molded plastic housing. The ignition key interlock comprises an interlock member which is controllable by the ignition actuator to move between at least (i) a block position in which the interlock member is positioned to block the shift lever control member from the shift lever unblock position, and (ii) an unblock position in which the interlock member is positioned not to block the shift lever control member from the shift lever unblock position. It should be understood that as the phrase is used here, the interlock member is controllable by the ignition actuator at least (but not necessarily any more than) in the sense that under selected operating conditions the ignition actuator (e.g., a rotatable ignition key socket or the like) can change the condition of the interlock member, e.g., change its position or its configuration or the like. In certain exemplary embodiments the ignition actuator, only with the key in place, is configured to be operable to move the interlock member from the block position to the unblock position (whereby the BTSI is freed to release the shift lever from the PARK position). Without the key, the ignition actuator of the shifter assembly is inoperable to move the interlock member from the block position to the unblock position. Thus, in at least certain exemplary embodiments of the automatic transmission shifter assemblies disclosed here, the ignition key interlock mounted to the unitary molded plastic housing component of the shifter assembly is operable to prevent the BTSI from releasing the shift lever from the PARK position unless the key is in place and the interlock member has been put into its unblock position.

In certain exemplary embodiments further described below, the interlock member is locked in the unblock position by the BTSI, e.g., by an axial rod member controlled by a solenoid of the BTSI, when the BTSI is powered. In typical strategies for transmission shifter assemblies according to this disclosure, the BTSI is powered at least when the foot brake of the vehicle is actuated by the vehicle driver. Also, in certain exemplary embodiments the interlock member of the ignition key interlock of the automatic transmission shifter assemblies disclosed here is spring biased from the block position toward the unblock position. Thus, when free to move between its block position and its unblock position, e.g., when the ignition actuator has received the vehicle's ignition key and been moved to the ON or START position, the spring bias will move the interlock member to the unblock position. The BTSI will continue to block the shift lever until the BTSI is actuated. Once actuated, the BTSI will lock the interlock member in the unblock member and the interlock member in that position will, in turn, block the ignition actuator from returning to a position that allows removal of the key. In accordance with certain such exemplary embodiments, the BTSI is configured to be kept in such open position when the shift lever is moved from the PARK position. Thus, in such embodiments the ignition key cannot be removed from the ignition during normal operation of the vehicle.

In certain exemplary embodiments of the automatic transmission shifter assemblies disclosed here, the ignition actuator comprises a stop surface that is rotatable with the ignition key socket, e.g., a cam surface, as made clearer below. The stop surface may be a portion of a unitary molded plastic body forming the stop surface, socket and other features or portions of the ignition key socket. In such embodiments optionally the interlock member has a contact or blocking surface which in the unblock position (i.e., the position of the interlock member that does not block the BTSI) is positioned to contact the stop surface to prevent rotation of the ignition key socket to the LOCK position. In certain configurations it may optionally also prevent rotation to the ACC position. Thus, the interlock member can in such embodiments, when in position corresponding to the vehicle running, prevent the ignition key socket from returning to a position in which the ignition key can be withdrawn. In certain exemplary embodiments the same contacting surfaces, i.e., the cam or stop surface that is part of (or otherwise rotationally fixed to) the ignition key socket and the contact surface of the interlock member interact to move the interlock member against the opposed biasing force mentioned above. Thus, upon receiving the ignition key, the ignition key socket is rotated from the LOCK position to the ACC or ON or Start position, thereby moving the cam or stop surface of the ignition key socket against the blocking surface of the interlock member and so moving the interlock member (against the aforesaid bias force) toward its unblock position by cam action, wedge action or the like. As disclosed above, interaction of the same surfaces against one another in certain exemplary embodiments of the shifter assemblies disclosed here then operates to prevent return of the ignition key socket if the interlock member is locked (e.g., by the BTSI) in the unblock position.

Certain exemplary embodiments of the automatic transmission shifter assemblies disclosed here comprise a manual release for the BTSI. The manual release is operative to release the shift lever from the PARK position, when the powered actuator is malfunctioning and, in some embodiments even when the solenoid or other powered actuator is applying force to urge the shift lever control member to the shift lever block position. The manual release for the brake transmission system interlock can in certain exemplary embodiments comprise a push button exposed to view of the vehicle operator and a contact surface linked to the push button. In certain exemplary embodiments the contact surface is operably linked to the shift lever control member of the BTSI, e.g., by contacting a surface of an arm or flange of the shift lever control member, such as a unitary extension thereof. The manual release can be mounted to the unitary molded plastic housing for manual movement between (i) a normal position in which the manual release does not release the shift lever from the PARK position when the powered actuator is applying force to urge the shift lever control member to the shift lever block position, and (ii) a release position in which the manual release does release the shift lever from the PARK position. In certain exemplary embodiments the manual release is operative to release the shift lever even when the powered actuator is applying force to urge the shift lever control member to the shift lever block position. Optionally such contact surface of the manual release is unitary with a manually operable push button integrated with the shifter assembly, e.g., by mounting a spring-biased push button to the unitary molded plastic housing component of the shift lever support.

In accordance with another aspect, an automatic transmission shifter assembly for controlling the gear setting of a motor vehicle transmission having at least park, neutral and drive gear settings, comprises a shift lever support configured for attachment to a vehicle, the shift lever support comprising a unitary molded plastic housing component having longitudinally and laterally extending segments, including at least an ignition key socket segment and a pair of laterally spaced segments with a shift lever throw-space therebetween. As used here, a "segment" of the unitary housing can be any flange, wall support or bracket surface or the like. The automatic transmission shifter assembly according to this aspect of the disclosed subject matter also comprises a shift lever pivot pin extending at least between the pair of laterally spaced segments and a shift lever pivotally mounted to the shift lever pivot pin to shift between a plurality of gear shift positions including at least, in any order, PARK, NEUTRAL and DRIVE positions. These positions correspond to park, neutral and drive transmission settings, respectively. The shift lever comprises a shift lever shaft and a pivot structure attached at a lower end of the shift lever shaft. At least a portion of the shift lever shaft and pivot structure are positioned in the shift lever throw-space. The automatic transmission shifter assembly further comprises a brake transmission system interlock (BTSI) mounted to the unitary molded plastic housing and comprising a solenoid and a shift lever control member controllable by actuation of the solenoid to move between at least (i) a shift lever block position in which the shift lever control member is positioned to block the shift lever from moving out of the PARK position, and (ii) a shift lever unblock position in which the shift lever control member is not positioned to block the shift lever from moving out of the PARK position. The automatic transmission shifter assembly further comprises an electronic ignition switch mounted to the unitary molded plastic housing and having at least an ON condition corresponding to a vehicle's power system running, a LOCK condition corresponding to a vehicle's power system not running, and an IGNITION condition corresponding to initial ignition of a vehicle's power system from a not running condition. The automatic transmission shifter assembly further comprises an ignition key socket mounted to the ignition key socket segment, and configured to receive a key. With a key received in place the ignition key socket is rotatable between at least a LOCK position, an ON position and an IGNITION position to control the condition of the electronic ignition switch between the LOCK condition, the ON condition and the IGNITION condition, respectively. The automatic transmission shifter assembly further comprises an ignition key interlock mounted to the unitary molded plastic housing and comprising a key interlock lever controllable by movement of the ignition key socket to move between at least (i) a block position in which a key interlock lever is positioned to block the brake transmission system interlock from the shift lever unblock position, and (ii) an unblock position in which a key interlock lever is not positioned to block the brake transmission system interlock from the shift lever unblock position. It should be understood that, as used here, the phrase "key interlock lever controllable by movement of the ignition key socket" means that the key interlock lever is controllable under at least certain normal operating conditions to make at least certain position (or other condition) changes in response to operation of the ignition key socket.

In certain exemplary embodiments automatic transmission shifter assemblies as disclosed immediately above, the ignition key socket in at least the ON position and the IGNITION position is configured to resist withdrawal of the ignition key, and in at least the LOCK position is configured not to resist withdrawal of the key. In certain such embodiments the key interlock lever in the unblock position blocks the ignition key socket from the LOCK position. The key interlock lever of the ignition key interlock optionally is spring biased from the block position toward the unblock position. The BTSI optionally can be configured to lock the interlock member of the ignition key interlock in the unblock position when the control member of the brake transmission system interlock is in the shift lever unblock position. In certain exemplary embodiments the key interlock lever when locked in the unblock position by the brake transmission system interlock blocks rotation of the ignition key socket to the LOCK position. For example, the ignition key socket may have a cam surface rotationally fixed with the ignition key socket, and the key interlock lever in the unblock position can present a blocking surface positioned to contact the cam surface to block rotation of the ignition key socket to the LOCK position. The same surfaces can be employed as linkage or operative contacting surfaces between the interlock layer and the ignition key socket to move the interlock member to the unblock position from the block position, e.g., upon starting the vehicle engine.

It will be appreciated by those skilled in the art, that is, by those having skill and experience in the technology areas involved in the novel automatic transmission shifter assemblies disclosed here, that significant advantages can be achieved by such shifter assemblies. For example, in certain embodiments described further below, design improvement, overall cost efficiency and/or vehicle operator convenience can be achieved. Additional advantages will be apparent to those skilled in the art given the benefit of this disclosure.

The figures referred to above are not drawn necessarily to scale and should be understood to provide a representation of certain exemplary embodiments of the invention, illustrative of the principles involved. Some features depicted in the drawings may have been enlarged or distorted relative to others to facilitate explanation and understanding. Particular configurations, dimensions, orientations and the like for any particular embodiment will typically be determined, at least in part, by the intended application and by the environment in which it intended to be used.

DETAILED DESCRIPTION OF CERTAIN EXEMPLARY EMBODIMENTS

An "automatic transmission shifter assembly for a vehicle" in accordance with this disclosure may be fully assembled and installed in a vehicle or may be fully assembled and ready for installation in a vehicle. Alternative embodiments of the automatic transmission shifter assemblies in accordance with this disclosure may be less than fully assembled, for example, where some assembly occurs during or after installation into the vehicle. Certain exemplary embodiments of automatic transmission shifter assemblies in accordance with this disclosure may themselves be sub-assemblies of a larger or more complete shifter assembly. Also as used here (meaning in this disclosure and description of certain exemplary embodiments and in the claims at the end) the "lateral" direction is the side-to-side direction, that is, the direction perpendicular to the vehicle's normal forward direction of travel, unless a different meaning is made clear by the context of usage. The fore-and-aft direction is substantially parallel to the vehicle's normal forward direction of travel, unless a different meaning is made clear by the context of usage. Thus, forward is at least approximately the vehicle's normal forward direction of travel and rearward is at least approximately the opposite direction, unless a different meaning is made clear by the context of usage. The down direction is at least approximately the direction of gravity and the up direction is at least approximately the opposite direction, unless a different meaning is made clear by the context of usage. When discussing any of the appended drawings, directional references are intended to be consistent with the view shown in such drawing(s), unless a different meaning is made clear by the context of usage.

The ignition actuator of certain exemplary embodiments of the automatic transmission shifter assemblies disclosed here comprise an ignition key socket mounted to the unitary molded plastic housing and configured to receive a key to control the condition of the electronic ignition switch. The ignition key socket in such embodiments is controllable with a key received therein. More specifically, the ignition key socket in such embodiments is controllable between positions including at least (i) an IGNITION position corresponding to the IGNITION condition of the electronic ignition switch, and (ii) a NON-IGNITION position corresponding to the NON-IGNITION condition of the electronic ignition switch. In certain such embodiments, with a key received in the ignition key socket, i.e., with the ignition key socket in place, is rotatably movable between the IGNITION and NON-IGNITION positions. In certain alternative embodiments the ignition actuator is a push button type, such that, for example, with the ignition key in place, the ignition actuator can be pushed to cause engine ignition.

Referring now to the drawings, FIGS. 1-7 are seen to illustrate an automatic transmission shifter assembly 10 suitable for use in passenger cars, light trucks, etc. Shifter assembly 10 has a shift lever support 12 configured for attachment to a vehicle body panel, such as the floor of the passenger vehicle compartment. The shift lever support 12 comprises a unitary molded plastic housing component 14, insert-molded reinforcements 16 to strengthen attachment to the vehicle, a bezel 18 showing a serpentine shift lever path 19 and marked "P-R-N-D" signifying the various gear settings of the shift lever corresponding to the gear settings of the vehicle transmission. It will be recognized by those skilled in the art that the shift path may follow any suitable gear shift strategy, for example, a serpentine path as in the illustrated embodiment, a straight shift lever throw path, etc. It will be apparent to those skilled in the art, given the benefit of this disclosure, that the unitary molded plastic housing component 14 and the other components of the shift lever support, along with the location of reinforcement of inserts 16 and the like will depend on the particular configuration required for a particular vehicle application. Thus, the shift lever support can be configured differently for different vehicles.

A shift lever 20 is seen to be mounted to the shift lever support 12. More specifically, shift lever 20 is seen to comprise a shift knob 22 mounted at the upper end of shift lever shaft 24. Optional thumb release 24 is provided in shift knob 22 in accordance with known techniques. Thumb release 24, for example, may operate a vertically movable release shaft running downwardly through the center of a hollow shift lever shaft 24. Typically, the shift lever will be movable or shiftable between a plurality of gear shift positions including at least, in any order, PARK, NEUTRAL and DRIVE positions in accordance with known automatic transmission shift strategies. It will be apparent to those skilled in the art, given the benefit of this disclosure, that any suitable gear shift pattern may be employed that is consistent with the transmission employed in the vehicle.

Figure 1:
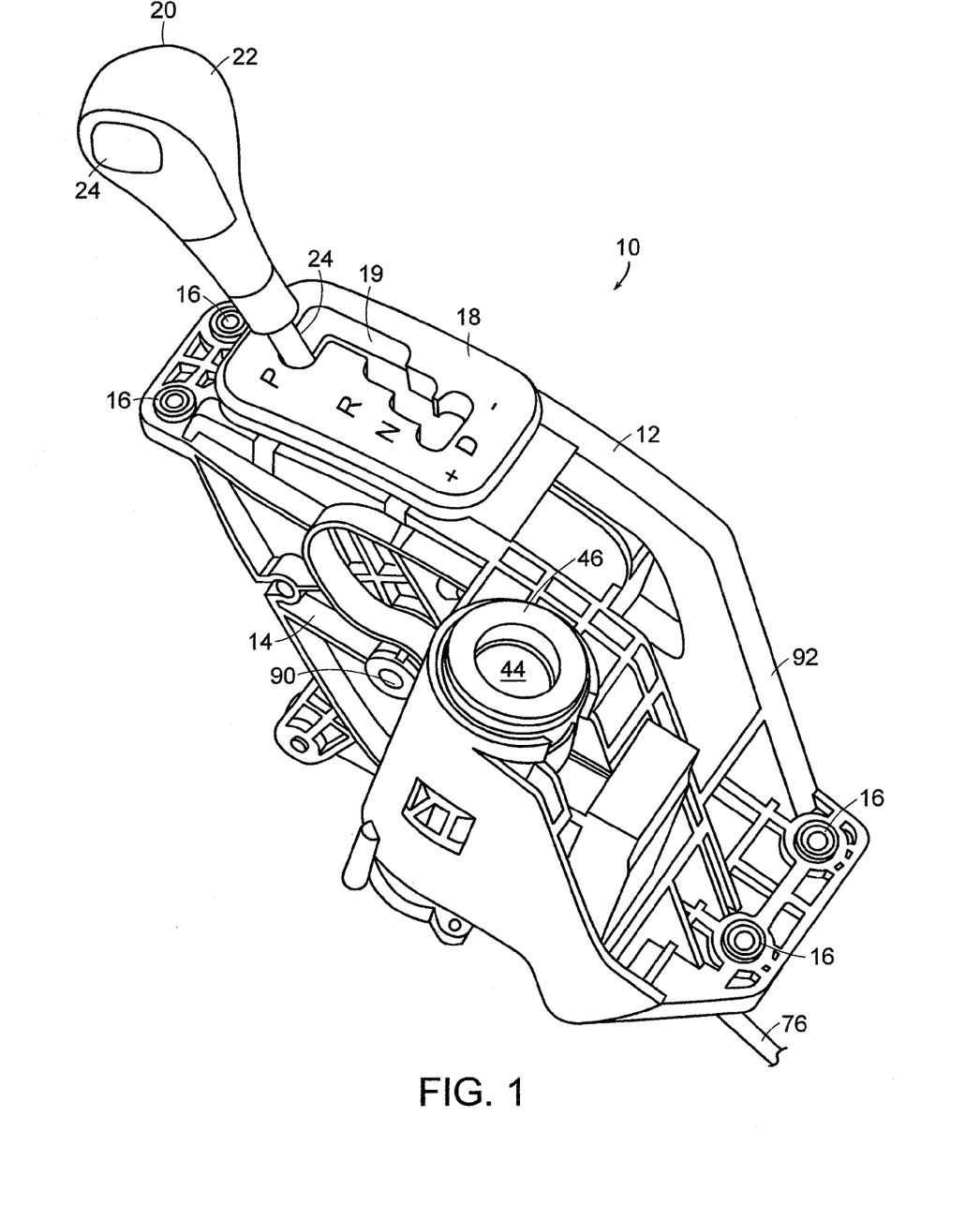
FIG. 1 is a schematic perspective view of a motor vehicle automatic transmission shifter assembly in accordance with an exemplary embodiment of the novel subject matter disclosed here.
Figure 2:
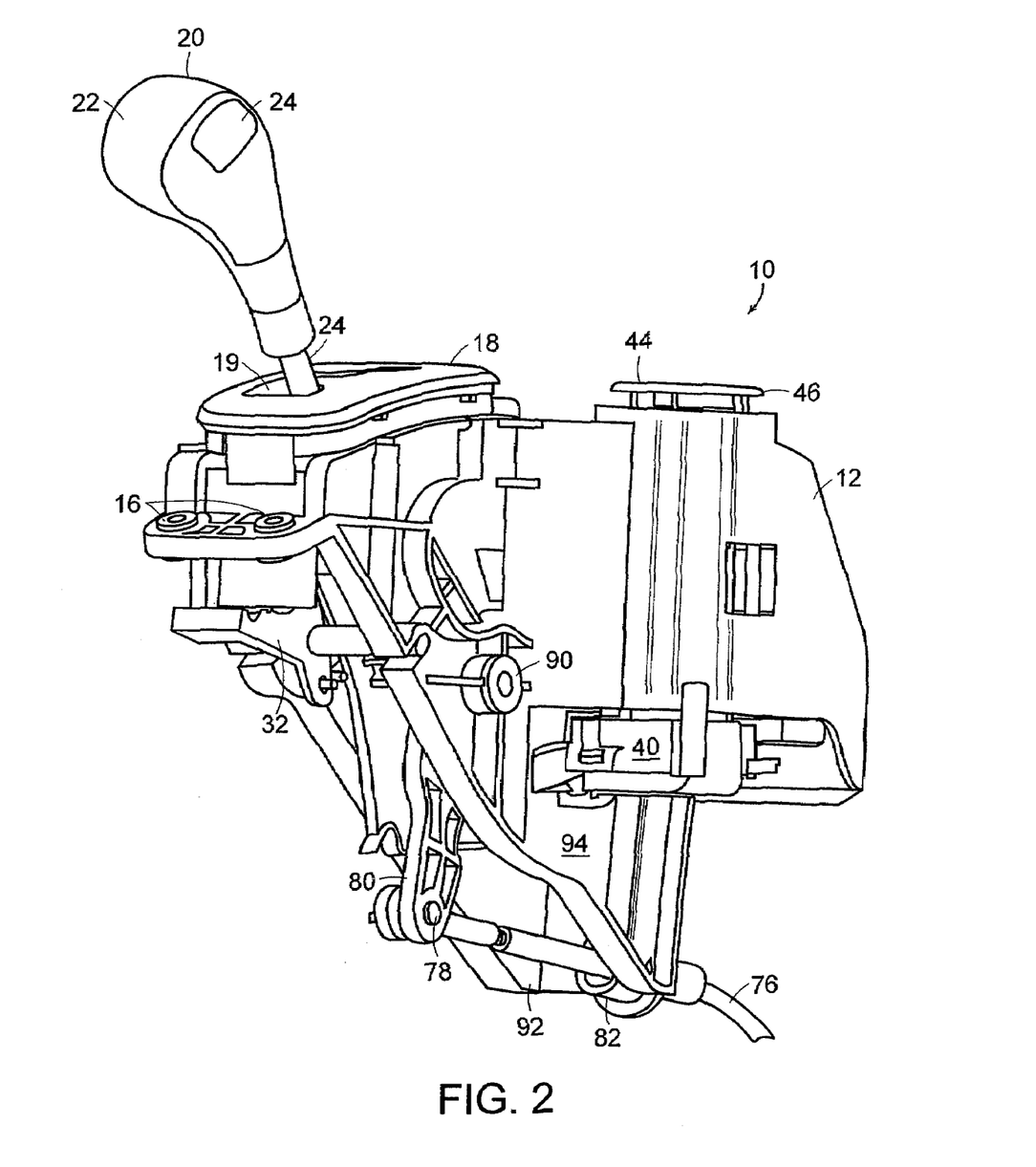
FIG. 2 is a schematic perspective view of the automatic transmission shifter assembly of FIG. 1 from another angle of view.
Figure 3:
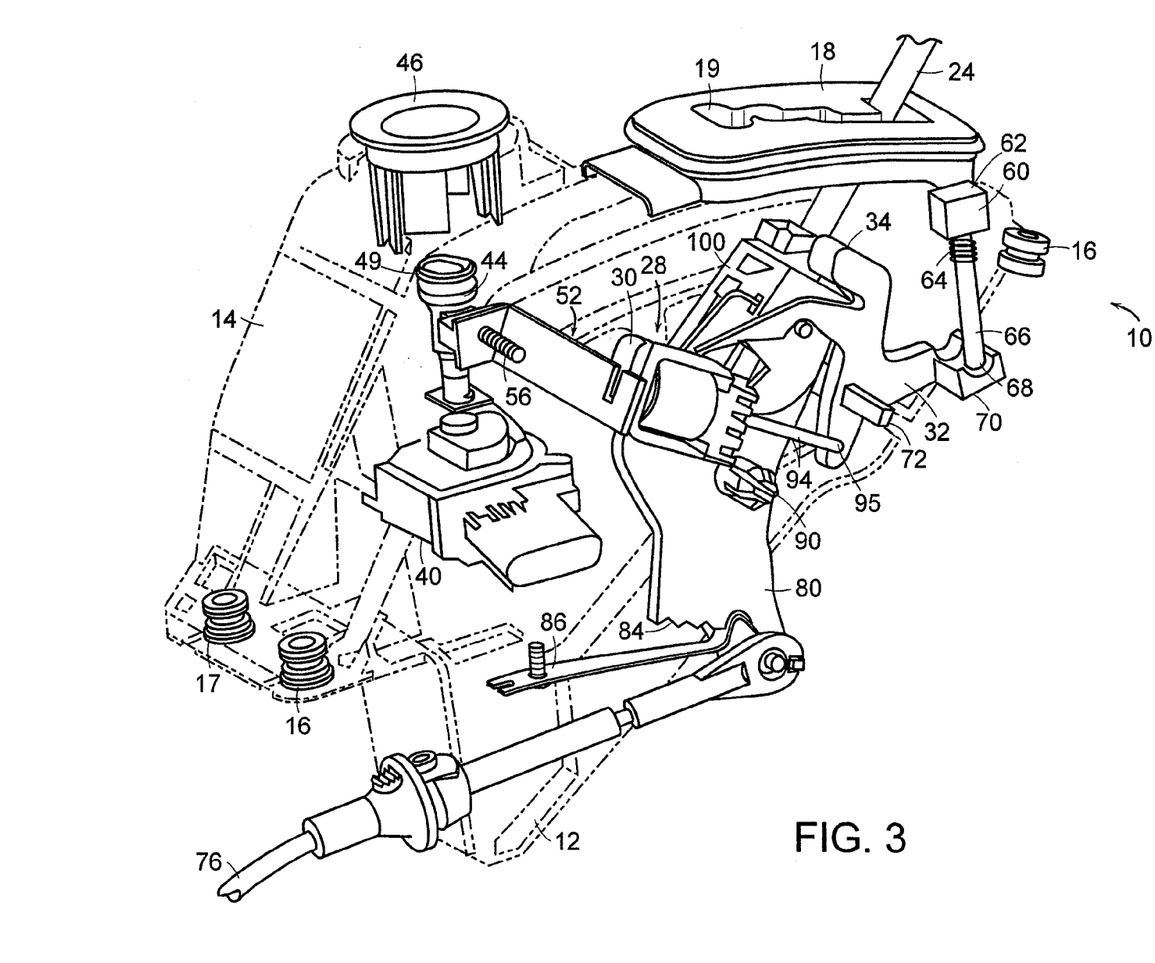
FIG. 3 is a schematic perspective view, partially broken away and partially in phantom, taken from another viewing angle, of the automatic transmission shifter assembly of FIG. 1.
Figure 4:
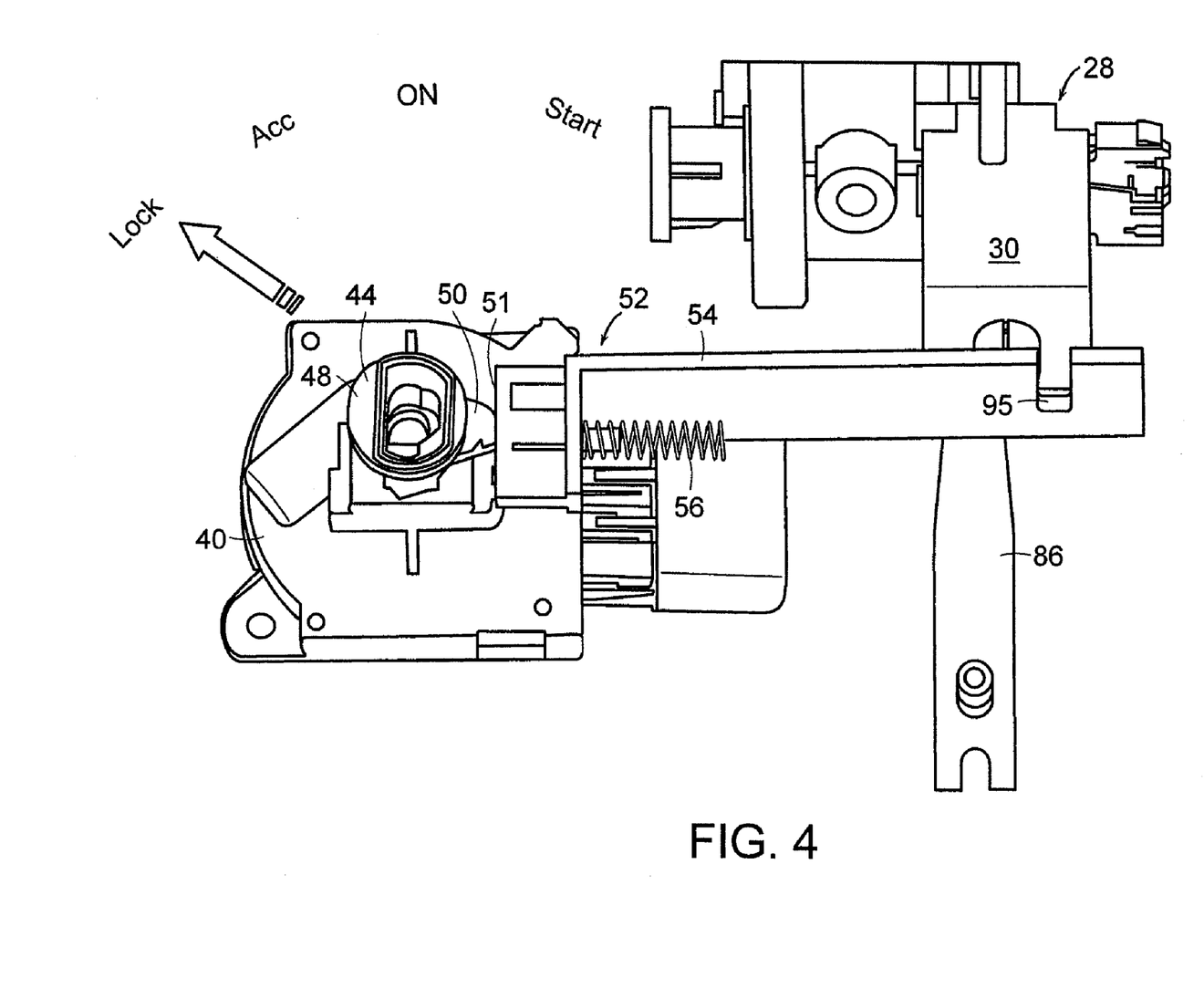
FIG. 4 is a schematic perspective view, partially broken away, of the key interlock and brake transmission system interlock of the automatic transmission shifter assembly of FIG. 1, shown in the "key in LOCK" condition.
Figure 6:
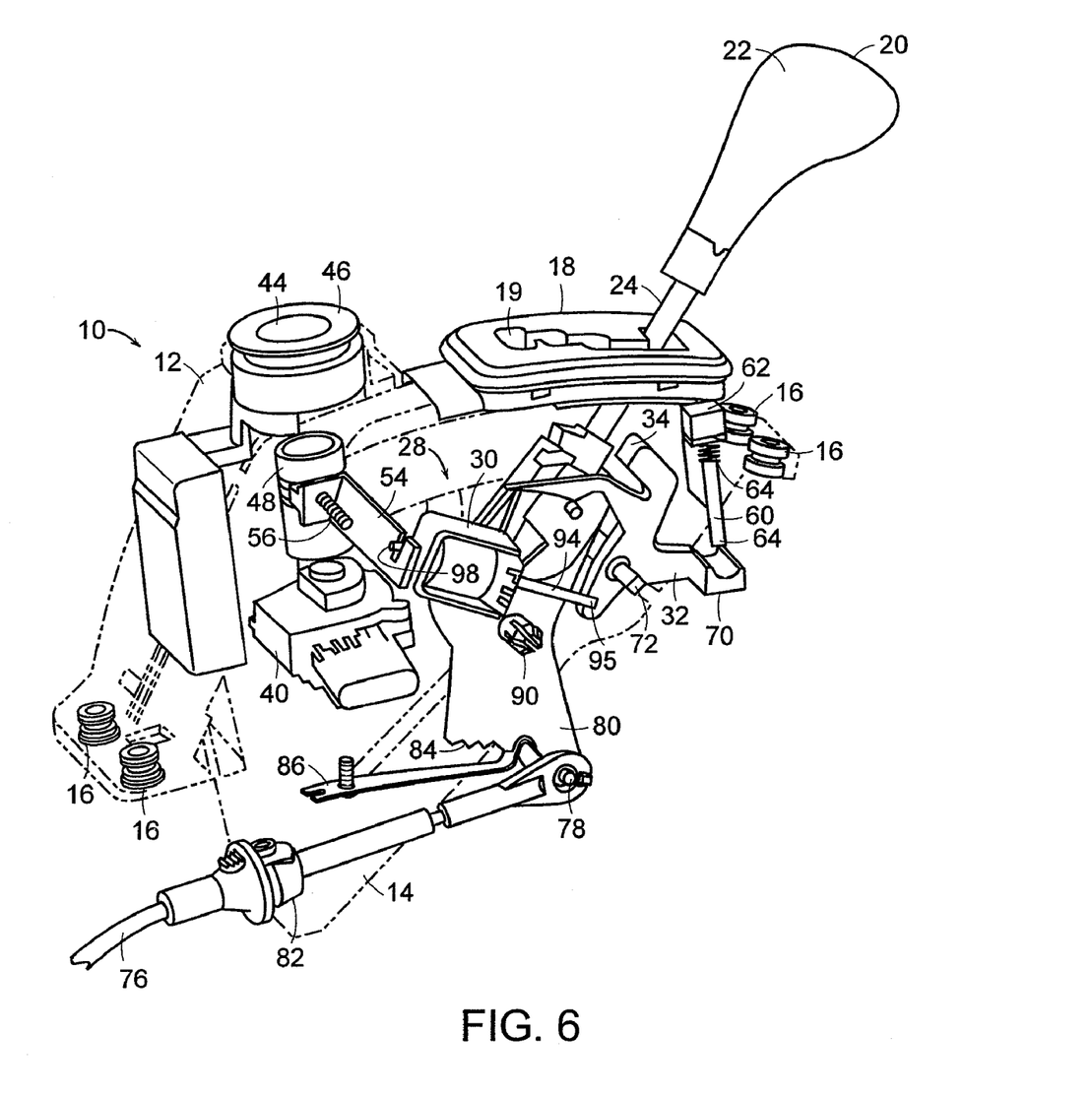
FIG. 6 is a schematic perspective view of the automatic transmission shifter assembly of FIG. 1, shown partially broken away and partially in phantom, shown in the "key in ACC" condition or the "key in ON" condition.
Figure 7:
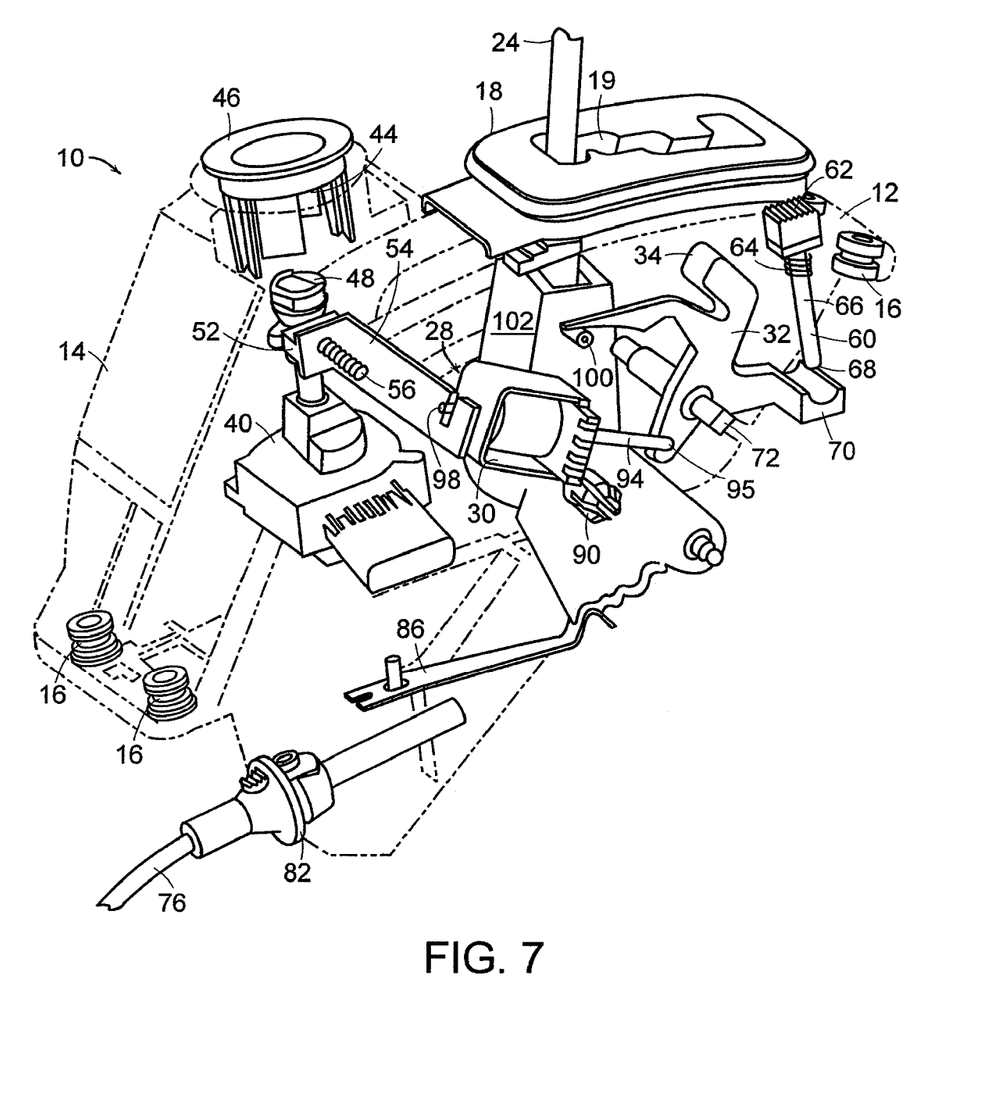
FIG. 7 is a schematic perspective view similar to FIG. 6, partially broken away and partially in phantom, of the automatic transmission shifter assembly of FIG. 1, with the shift lever moved out of the PARK gear setting and the BTSI lever in the OPEN position.

The automatic transmission shifter assembly 10 is seen to further comprise a brake transmission system interlock 28 mounted to unitary molded plastic housing component 14. The brake transmission system interlock 28, commonly referred to as a "BTSI" comprises a powered actuator 30 having elongate output member 94 and a shift lever control member 32. Control member 32 is rotatably mounted via mounting pivot 72. Control member 32 is controllable by actuation of powered actuator 30 to apply force to urge the control member to a position in which it blocks the shift lever 20 in PARK position. As best seen in FIG. 3, for example, the top end 34 of shift lever control member 32 is positioned adjacent shift lever shaft 24 such that shift lever shaft 24 is retained in the PARK position. As viewed in FIG. 3, shift lever shaft 24 is prevented from moving towards the right-foreground by the top end 34 shift lever control member 32. In contrast, as best seen in FIG. 6, with the BTSI in an open position when solenoid 30 is powered on or the manual release lever (discussed further below) is pressed downwardly, the shift lever shaft 24 is free to move out of PARK position and into other gear settings. In FIG. 7, shift lever 24 is seen to be moved out of the PARK position.

Automatic transmission shifter assembly 10 further comprises an electronic ignition switch 40 mounted into the shift lever support 12. In the illustrated embodiment, the electronic switch 40 is mounted to unitary molded plastic housing 14. Electronic ignition switch 40 has multiple conditions including at least (i) an IGNITION condition corresponding to ignition of a vehicles power system and, (ii) a NON-IGNITION condition. Typically, the ignition switch will have conditions corresponding to an OFF or LOCK position, ACCESSORY-POWER position (referred to herein by the short hand term "ACC") an ON position corresponding to a condition in which the ignition switch enables operation of the vehicle engine or motor, and a START position corresponding to a condition of the ignition switch which enables or causes initial ignition of the engine or motor from a not running condition.

The automatic transmission shifter assembly 10 further comprises an ignition actuator 44 mounted to the shift lever support. In the illustrated embodiment, ignition actuator 44 is mounted to unitary molded plastic housing 14. Ignition actuator 44 is operative to control the condition of the electronic switch. Ignition actuator 44 in the illustrated embodiment comprises an ignition key socket 46 which is rotationally fixed to key shaft 48 having cam 50 unitary therewith. It can be seen that ignition key socket 46 is adapted to receive an ignition key. With the ignition key in place, ignition key sock 46 is configured to rotate and thereby correspondingly to rotate key shaft 48. Rotation of key shaft 48, in turn, puts ignition switch 40 into a corresponding condition. Thus, rotation of ignition key socket 46 from the LOCK to the START position causes the ignition switch 40 in the illustrated embodiment to be in the IGNITION condition whereby the vehicle engine or motor is started. In this respect, the ignition actuator can follow any suitable position strategy, e.g., those currently known to those skilled in the art for ignition key control of vehicle operation.

Automatic transmission shifter assembly 10 further comprises ignition key interlock 52 mounted to shift lever support 12. In the illustrated embodiment, ignition key interlock 52 is mounted to unitary molded plastic housing component 14. Ignition key interlock 52 comprises an interlock member 54 controllable by multiple different components, including in the illustrated embodiment, the ignition actuator 44. As controlled by ignition actuator 44, interlock member 54, in the form of an interlock lever, is movable between at least (i) a block position in which the interlock member 54 is positioned to block the shift lever control member 32 from the shift lever unblock position, and (ii) an unblock position in which interlock member 54 is positioned not to block shift lever control member 32 from the shift lever unblock position. In the illustrated embodiment, interlock member 54 is biased, specifically, spring biased, from the block position toward the unblock position. More specifically, coil spring 56 biases the interlock lever 54 toward the left as viewed in FIGS. 4 and 5.

The automatic transmission shifter assembly 10 illustrated in the appended drawings further comprises a manual release for the shift lever 20. In general, manual release 60 acts to bypass or override the BTSI to release the shift lever from the PARK POSITION even when the powered actuator, i.e. solenoid 30 is applying force to urge the shift lever control member to the shift lever block position. In this way, the vehicle can be operated even in the event of a malfunction of the BTSI. In the illustrated embodiment, manual release 60 comprises a push button 62 presented at the upper surface of unitary molded plastic housing component 14 for ergonomic access by a vehicle operator. Push button 62 is upwardly biased by coil spring 64 wrapped concentrically about shaft 66. It can be seen that manually depressing push button 62 downwardly will cause contact surface 68 at the bottom of manual release shaft 66 to contact arm or extension 70 of control member 32. Downward movement of arm 70 will cause rotation of shift lever control member 32 about mounting pivot 72, whereby upper end 34 of shift lever control member 32 will be moved out of it's shift lever block position. Referring to FIG. 6, for example, shift lever control member 32 is seen to be clockwise pivoted about mounting pivot 72 by operation for actuation of solenoid 30, thereby moving upperend 34 to the shift lever unblocked position seen in FIG. 6. It would appreciated that downward pressure on push button 62 of manual release mechanism 60 will likewise cause such clockwise rotation of shift lever control member 32 about mounting pivot 72. In the illustrated embodiment contact surface 68 is unitary with push button 62. It will be recognized, however, by those skilled in the art, given the benefit of this disclosure, that alternative arrangements are possible whereby push button 62 is linked to contact surface 68 by suitable intermediate members.

It can be seen that the shift lever 20, once released from the PARK position either by the manual override mechanism or by actuation of the BTSI, is free to shift the vehicle's transmission by operation of transmission cable 76. Transmission cable 76 is connected via pin 78 at the bottom of pivot structure 80. In the illustrated embodiment, transmission cable 76 is a BOWDEN cable mounted to the shift lever support 12 at mounting 82 in accordance with conventional technique. A rooster comb 84 is provided at a lower surface of pivot structure 80 for engagement by spring follower 86. Pivot structure 80 is mounted to the shift lever support, specifically in the illustrated embodiment to unitary molded plastic housing component 14, at pivot pin 90. Thus, the shift lever, including both shift lever shaft 24 and pivot structure 80 are rotatably mounted to the shift lever support via pivot pin 90. As best seen, for example, in FIG. 2, the shift lever is mounted in a throw-space defined between parallel vertical wall segments 92 and 94 of the unitary molded plastic housing component 14.

Figure 5:
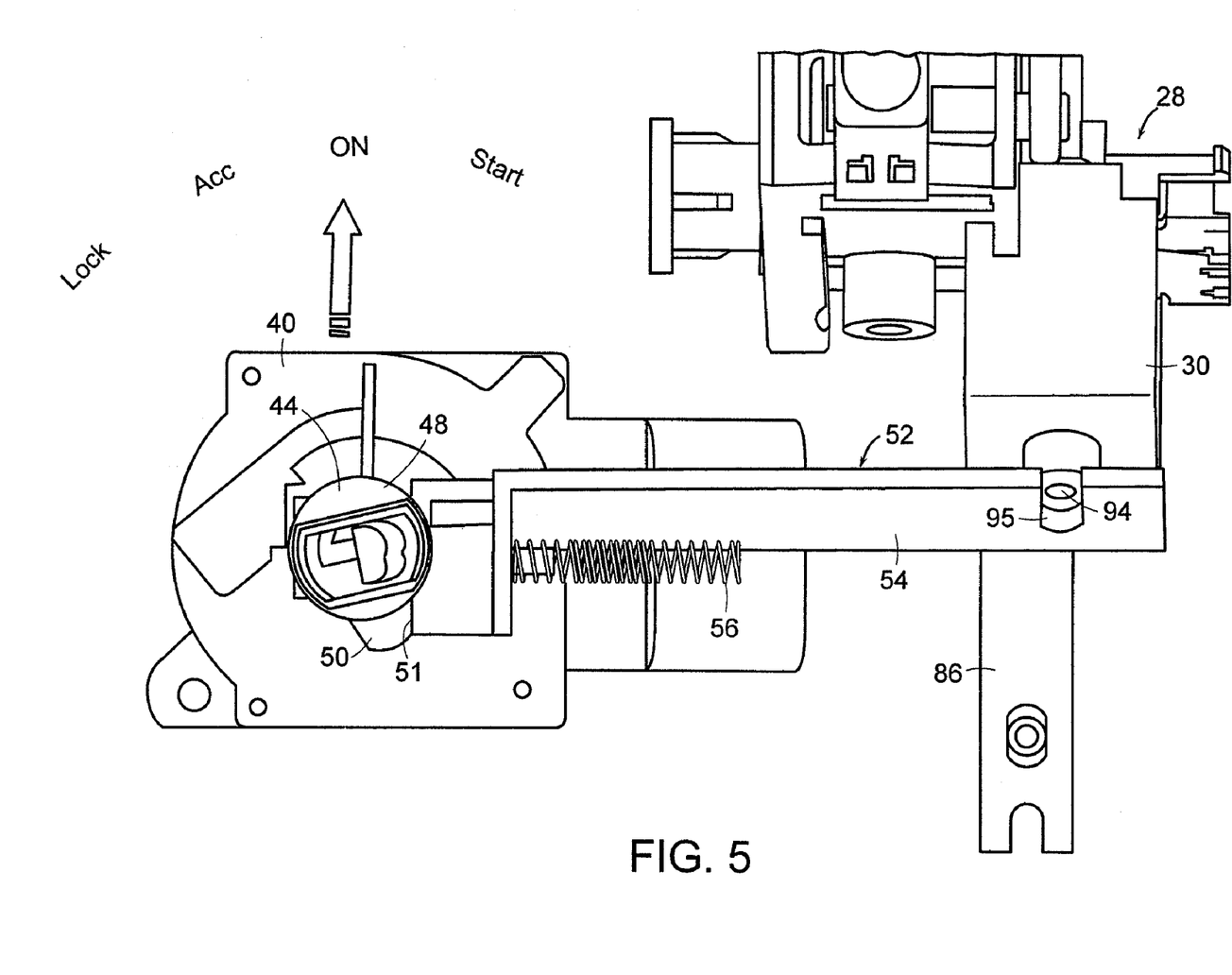
FIG. 5 is a schematic perspective view, partially broken away, of the key interlock and the BTSI system of FIG. 4 as shown in the "key in ACC" condition or the "key in ON" condition.

From the foregoing disclosure of certain exemplary embodiments, those skilled in the art will recognize that in at least certain embodiments of the novel subject matter disclosed here, automatic transmission shifter assemblies may comprise a simple mechanical linkage between the shifter mechanism and the ignition key unit. Integrating the ignition key unit into the shifter housing, and especially those embodiments wherein the ignition key unit is integrated into a unitary molded plastic housing component in accordance with the foregoing disclosure of certain exemplary embodiments, provides advantages including, in at least certain embodiments, eliminating the cable connection or the electric connection between the shifter assembly and a remote ignition key unit, thereby reducing overall cost, improving system reliability and security, and/or reducing overall vehicle control packaging size. Those skilled in the art, given the benefit of this disclosure, will recognize that at least certain embodiments of the shifter assemblies disclosed here can be designed to comply with US Federal Regulations for automatic transmission shifters for certain motor vehicles, including the key interlock function and the brake transmission system interlock (BTSI) function. The key interlock function requires that the key must be turned to the ACC or ON position in order to allow the driver to move the shift lever out of the PARK position (with actuation of the vehicle foot brake). Correspondingly, with the shift lever out of the PARK position, the ignition key must be retained (i.e., not removable) from the ignition key cylinder. The BTSI interlock function requires that the vehicle operator apply the foot brake in order to move the transmission shifter out of the PARK position. Such functions are advantageously achieved by at least certain exemplary embodiments the shift assemblies disclosed here, including, e.g., the embodiment illustrated in the appended drawings. That is, appended FIGS. 1-7 illustrate a motor vehicle automatic transmission shifter assembly with integrated ignition key unit, which assembly meets the key interlock and BTSI function requirements. In accordance with the illustrated embodiment, when there is no ignition key in the ignition key socket 44, such that the ignition key socket is in the LOCK position (see FIG. 4) key interlock lever 54 is pushed toward the right (as viewed in FIG. 4) by cam surface 50 of the ignition actuator 44. In that position the key interlock lever 54 blocks the solenoid shaft 94 which is connected to BTSI lever 32 at connection point 95. Because the shaft 94 solenoid 30 is blocked, the BTSI lever 32 does not move to the unblock position. Therefore, shift lever shaft 24 is prevented from moving out of the PARK gear setting, even when the driver applies the foot brake and so powers-on the solenoid 30. Once the ignition key is turned to the ACC or ON position, key interlock lever 54 is pushed toward the left (as viewed in FIGS. 4 & 5) by spring 56. This condition is best seen, for example, in FIG. 5 wherein the ignition key socket 48 is moved to the ON position. In FIG. 5, it can also be seen that solenoid shaft end 94 is aligned with opening 95 in key interlock lever 54. In this condition, when the vehicle foot brake is applied solenoid 30 is powered-on and this, in turn, moves solenoid shaft 94 generally upward and to the left as seen in FIGS. 6 & 7, such that shaft end 98 extends into or through notch 95 of the key interlock lever and BTSI lever 32 is correspondingly rotated clockwise about pivot mounting 72. This moves upper end 34 of BTSI lever 32 out of blocking position whereby shift lever shaft 24 can now be moved out of the PARK setting (see FIG. 6). When shift lever 20 is in any gear position other then PARK, a short pole or nub 100 on yoke 102 keeps the BTSI lever 32 in the OPEN position, as best seen in FIG. 7. Because the solenoid shaft 94 is pushed out by BTSI lever 32, whereby terminal end 98 of solenoid shaft 94 extends into or through notch 95 key interlock lever 54, the key interlock lever is held in the unblock position. That is, key interlock lever 54 is not free to move to the right or left (as viewed in FIGS. 4 & 5). Therefore, the ignition key socket 48 is prevented by the interaction of cam surface 50 with surface 51 of the key interlock lever 54 from rotating counter-clockwise (as viewed in FIGS. 4 & 5) back toward the LOCK position. Since the ignition key socket can not be returned to the LOCK position, the key cannot be removed in this condition.

While certain particular embodiments of the invention have been illustrated and described, it will be apparent to those skilled in the art that numerous modifications and additions can be made without departing from the true spirit and scope of the invention. Accordingly, it is not intended that the invention be limited except in accordance with the terms of the following claims. In the following claims, definite and indefinite articles such as "the," "a," "and," and the like, in accordance with traditional patent law and practice, mean "at least one." Thus, for example, reference above or in the claims to "an ignition key interlock mounted to the unitary molded plastic housing" means at least one ignition key interlock. Optionally, any one or more of multiple such ignition key interlocks may contain the features called for in any particular claim.

In general, unless expressly stated otherwise, all words and phrases are used above and in the following claims have all of their various different meanings, including, without limitation, any and all meaning(s) given in general purpose dictionaries, and also any and all meanings given in science, technology, medical or engineering dictionaries, and also any and all meanings known in the relevant industry, technological art or the like. Thus, where a term has more than one possible meaning, all such meanings are intended to be included for that term as used here. In that regard, it should be understood that if a device, system or method has the item as called for in a claim below (i.e., it has the particular feature or element called for, e.g., a unitary molded plastic housing component), and also has one or more of that general type of item but not as called for (e.g., it has one or more other unitary molded plastic housing components to which no shift lever is mounted) then the device, system or method in question satisfies the claim requirement. Those one or more extra items are simply ignored in determining whether the device, system or method in question satisfies the claim requirement.

I claim:

1. An automatic transmission shifter assembly comprising:
    a shift lever support configured for attachment to a vehicle, the shift lever support comprising a unitary molded plastic housing component;
    a shift lever mounted to the unitary molded plastic housing component to shift between a plurality of gear shift positions including at least, in any order, PARK, NEUTRAL and DRIVE positions;
    a brake transmission system interlock (BTSI) mounted to the unitary molded plastic housing component and comprising a powered actuator and a shift lever control member controllable by actuation of the powered actuator to apply force to control the portion of the shift lever control member in at least one of the positions including at least
        a shift lever block position in which the shift lever control member is positioned to block the shift lever from moving out of the PARK position, and
        a shift lever unblock position in which the shift lever control member is not positioned to block the shift lever from moving out of the PARK position;
    an electronic ignition switch mounted to the unitary molded plastic housing component and having conditions including at least
        an IGNITION condition corresponding to ignition of a vehicle's power system, and
        a NON-IGNITION condition;
    an ignition actuator mounted to the unitary molded plastic housing component and operative to control the condition of the electronic ignition switch, the ignition actuator having actuator conditions including at least
        an actuator IGNITION condition corresponding to the IGNITION condition of the electronic ignition switch, and
        an actuator NON-IGNITION condition corresponding to the NON-IGNITION condition of the electronic ignition switch; and
    an ignition key interlock mounted to the unitary molded plastic housing component and comprising an interlock member controllable by the ignition actuator to move between at least:
        a block position in which the interlock member is positioned to block the shift lever control member from the shift lever unblock position, and
        an unblock position in which the interlock member is positioned not to block the shift lever control member from the shift lever unblock position.

2. The automatic transmission shifter assembly of claim 1 wherein the ignition actuator comprises an ignition key socket mounted to the unitary molded plastic housing component and configured to receive a key to control the condition of the electronic ignition switch, the ignition key socket being controllable with a key received therein between positions including at least
    an IGNITION position corresponding to the IGNITION condition of the electronic ignition switch, and
    a NON-IGNITION position corresponding to the NON-IGNITION condition of the electronic ignition switch.

3. The automatic transmission shifter assembly of claim 2 wherein the ignition key socket with a key received therein is rotatably moveable between the IGNITION and NON-IGNITION positions.

4. The automatic transmission shifter assembly of claim 2 wherein the interlock member of the ignition key interlock is spring biased from the block position toward the unblock position.

5. The automatic transmission shifter assembly of claim 2 wherein the brake transmission system interlock locks the interlock member of the ignition key interlock in the unblock position when the control member of the brake transmission system interlock is in the shift lever unblock position.

6. The automatic transmission shifter assembly of claim 2 wherein the ignition key socket has
    a. at least one position corresponding to running the vehicle's power system and in which the ignition key socket is configured to resist withdrawal of a key therefrom, and
    b. at least one other position in which the ignition key socket is configured not to resist withdrawal of a key therefrom.

7. The automatic transmission shifter assembly of claim 6 wherein the interlock member in the unblock position is configured to block rotation of the ignition key socket to the position in which the ignition key socket is configured not to resist withdrawal of a key therefrom.

8. The automatic transmission shifter assembly of claim 7 wherein the ignition actuator comprises a stop surface rotatable with the ignition key socket, and the interlock member in the unblock position presents a blocking surface positioned to contact the stop surface to block rotation of the ignition key socket to the position in which the ignition key socket is configured not to resist withdrawal of a key therefrom.

9. The automatic transmission shifter assembly of claim 1 wherein the powered actuator is an electrically powered solenoid.

10. The automatic transmission shifter assembly of claim 1 further comprising a manual release for the brake transmission system interlock operative to release the shift lever from the PARK position when the powered actuator is applying force to urge the shift lever control member to the shift lever block position.

11. The automatic transmission shifter assembly of claim 10 wherein the manual release for the brake transmission system interlock comprises a push button and a contact surface linked to the push button, the manual release being mounted to the unitary molded plastic housing component for manual movement between
   a. a normal position in which the manual release does not release the shift lever from the PARK position when the powered actuator is applying force to urge the shift lever control member to the shift lever block position, and
   b. a release position in which the manual release does release the shift lever from the PARK position when the powered actuator is applying force to urge the shift lever control member to the shift lever block position.

12. The automatic transmission shifter assembly of claim 10 wherein the contact surface of the manual release is unitary with the push button.

13. An automatic transmission shifter assembly for controlling the gear setting of a motor vehicle transmission having at least park, neutral and drive gear settings, comprising:
   a shift lever support configured for attachment to a vehicle, the shift lever support comprising a unitary molded plastic housing component having longitudinally and laterally extending segments including at least
      a pair of laterally spaced segments with a shift lever throw-space therebetween, and
      an ignition key socket segment;
   a shift lever pivot pin extending at least between the pair of laterally spaced segments;
   a shift lever pivotally mounted to the shift lever pivot pin to shift between a plurality of gear shift positions including at least, in any order, PARK, NEUTRAL and DRIVE positions corresponding to park, neutral and drive transmission settings, respectively, the shift lever comprising a shift lever shaft and a pivot structure attached at a lower end of the shift lever shaft, at least a portion of the shift lever shaft and pivot structure being positioned in the shift lever throw-space;
   a brake transmission system interlock mounted to the unitary molded plastic housing component and comprising a solenoid and a shift lever control member controllable by actuation of the solenoid in at least one of:
      a shift lever block position in which the shift lever control member is positioned to block the shift lever from moving out of the PARK position, and
      a shift lever unblock position in which the shift lever control member is not positioned to block the shift lever from moving out of the park position;
   an electronic ignition switch mounted to the unitary molded plastic housing component and having at least an ON condition corresponding to a vehicle's power system running, a LOCK condition corresponding to a vehicle's power system not running, and an IGNITION condition corresponding to ignition of a vehicle's power system;
   an ignition key socket mounted to the ignition key socket segment, configured to receive a key and with a key received therein is rotatable between at least a LOCK position, an ON position and an IGNITION position to control the condition of the electronic ignition switch between the LOCK condition, the ON condition and the IGNITION condition, respectively; and
   an ignition key interlock mounted to the unitary molded plastic housing component and comprising a key interlock lever controllable by movement of the ignition key socket to move between at least:
      a block position in which a key interlock lever is positioned to block the brake transmission system interlock from the shift lever unblock position, and
      an unblock position in which a key interlock lever is not positioned to block the brake transmission system interlock from the shift lever unblock position.

14. The automatic transmission shifter assembly of claim 13 wherein the ignition key socket
   in at least the ON position and the IGNITION position is configured to resist withdrawal of a key therefrom, and
   in at least the LOCK position is configured not to resist withdrawal of a key therefrom,
and the key interlock lever in the unblock position blocks the ignition key socket from the LOCK position.

15. The automatic transmission shifter assembly of claim 14 wherein the key interlock lever of the ignition key interlock is spring biased from the block position toward the unblock position.

16. The automatic transmission shifter assembly of claim 14 wherein the brake transmission system interlock locks the interlock member of the ignition key interlock in the unblock position when the control member of the brake transmission system interlock is in the shift lever unblock position.

17. The automatic transmission shifter assembly of claim 16 wherein the key interlock lever when locked in the unblock position by the brake transmission system interlock blocks rotation of the ignition key socket to the LOCK position.

18. The automatic transmission shifter assembly of claim 17 wherein the ignition key socket comprises a cam surface rotationally fixed with the ignition key socket and the key interlock lever in the unblock position presents a blocking surface positioned to contact the cam surface to block rotation of the ignition key socket to the LOCK position.

* * * * *